United States Patent
Lee et al.

(10) Patent No.: US 9,388,581 B2
(45) Date of Patent: Jul. 12, 2016

(54) BIODEGRADABLE PANELS

(71) Applicant: LG HAUSYS, LTD., Seoul (KR)

(72) Inventors: Min Lee, Ansan-si (KR); Youn Woo Nam, Cheongju-si (KR); Si Young Lee, Cheongju-si (KR); Gun Soo Chung, Cheongju-si (KR)

(73) Assignee: LG HAUSYS, LTD., Seoul (KR)

( * ) Notice: Subject to any disclaimer, the term of this patent is extended or adjusted under 35 U.S.C. 154(b) by 231 days.

(21) Appl. No.: 14/116,823

(22) PCT Filed: Sep. 21, 2012

(86) PCT No.: PCT/KR2012/007609
§ 371 (c)(1),
(2) Date: Nov. 11, 2013

(87) PCT Pub. No.: WO2014/046321
PCT Pub. Date: Mar. 27, 2014

(65) Prior Publication Data
US 2014/0370253 A1    Dec. 18, 2014

(51) Int. Cl.
| | |
|---|---|
| *B32B 3/10* | (2006.01) |
| *E04F 13/00* | (2006.01) |
| *B32B 27/10* | (2006.01) |
| *E04F 13/077* | (2006.01) |
| *B32B 27/12* | (2006.01) |
| *B32B 27/26* | (2006.01) |

(Continued)

(52) U.S. Cl.
CPC ............... *E04F 13/002* (2013.01); *B32B 27/10* (2013.01); *B32B 27/12* (2013.01); *B32B 27/26* (2013.01); *B32B 27/304* (2013.01); *B32B 27/36* (2013.01); *E04F 13/077* (2013.01); *B32B 2255/24* (2013.01); *B32B 2255/26* (2013.01); *B32B 2255/28* (2013.01); *B32B 2270/00* (2013.01); *B32B 2307/7163* (2013.01); *B32B 2307/75* (2013.01); *B32B 2367/00* (2013.01); *B32B 2607/02* (2013.01); *Y10T 428/24802* (2015.01); *Y10T 428/24868* (2015.01)

(58) Field of Classification Search
CPC ....................................................... E05F 13/03
See application file for complete search history.

(56) References Cited

U.S. PATENT DOCUMENTS

| | | | |
|---|---|---|---|
| 2005/0003174 A1* | 1/2005 | Ikeda | ............ B32B 27/10 428/219 |
| 2007/0088099 A1* | 4/2007 | Mentink et al. | ............ 523/124 |
| 2009/0258175 A1* | 10/2009 | Matsuoka | ............ C08J 9/0061 428/36.5 |

(Continued)

FOREIGN PATENT DOCUMENTS

| | | |
|---|---|---|
| CN | 103534091 A | 1/2014 |
| JP | 11207873 A | 8/1999 |

(Continued)

OTHER PUBLICATIONS

Processing and Finishing of Polymer Materials by Wiley p. 16, retrieved Jul. 27, 1987.*

(Continued)

*Primary Examiner* — Bruce H Hess
*Assistant Examiner* — Christopher Polley
(74) *Attorney, Agent, or Firm* — Hauptman Ham, LLP

(57) ABSTRACT

The present invention relates to panels. The panels include a panel layer and a printed layer formed on the panel layer. The panel layer includes a polylactic acid (PLA) resin. The panels are environmentally friendly and biodegradable.

14 Claims, 1 Drawing Sheet

(51) Int. Cl.
*B32B 27/30* (2006.01)
*B32B 27/36* (2006.01)

(56) References Cited

U.S. PATENT DOCUMENTS

2010/0015420 A1* 1/2010 Riebel .................... B32B 27/06
                                                        428/203
2011/0217523 A1* 9/2011 Huang et al. ............... 428/195.1

FOREIGN PATENT DOCUMENTS

| JP | 2004107413 A | 4/2004 |
|----|---|---|
| JP | 2004277679 A | 10/2004 |
| JP | 2007301823 A | 11/2007 |
| JP | 2011511889 A | 4/2011 |
| KR | 1020110103811 A | 9/2011 |
| KR | 1020110103813 A | 9/2011 |
| KR | 1020110103898 A | 9/2011 |
| WO | WO 2010050730 A2 * | 5/2010 |
| WO | 2011037325 A2 | 3/2011 |
| WO | 2011115413 A2 | 9/2011 |
| WO | 2012086960 A2 | 6/2012 |

OTHER PUBLICATIONS

Japanese Office Action dated Jan. 20, 2015, citing the above reference(s).
International Search Report for PCT/KR2012/007609 mailed on Apr. 30, 2013, citing the above reference(s).
Written Opinion for PCT/KR2012/007609 mailed on Apr. 30, 2013, citing the above reference(s).
Japanese Office Action dated Jun. 2, 2015 in connection with the counterpart Japanese Patent Application No. 2014-536971, citing the above reference(s).
Chinese Office Action dated Jun. 23, 2015 in connection with the counterpart Chinese Patent Application No. 201280022811.0, citing the above reference(s).

* cited by examiner

BIODEGRADABLE PANELS

CROSS REFERENCE TO RELATED APPLICATION

This application is the National Phase application of International Application No. PCT/KR2012/007609 filed on Sep. 21, 2012, which is incorporated herein by reference in its entirety.

TECHNICAL FIELD

The present invention relates to panels, and more particularly, to environmentally friendly biodegradable panels including a panel layer and a printed layer formed on the panel layer wherein the panel layer includes a polylactic acid (PLA) resin.

BACKGROUND ART

Sheets using petroleum resins such as polyvinyl chloride (PVC) are widely used in various building structures such as houses, mansions, apartments, offices, and stores.

Such sheets are produced by T-die extrusion or calendering of resins such as polyvinyl chloride (PVC). Raw materials for these sheets are exclusively derived from limited resources such as crude oil. It is thus anticipated that the depletion of petroleum resources will lead to various problems related to the supply of raw materials.

As interest in environmental issues is recently growing in importance, polyvinyl chloride (PVC) sheets are problematic in that they are likely to emit harmful substances and create an environmental burden even after disposed of.

DISCLOSURE

Technical Problem

An aspect of the present invention is to provide an environmentally friendly panel that uses a PLA resin, which can solve problems associated with the supply of raw materials of the constituent layers.

Particularly, another aspect of the present invention is to provide a biodegradable panel that uses wood flour or fiber as a reinforcing agent and has a panel layer including a PLA resin, achieving environmental friendliness and good dimensional stability.

Technical Solution

In accordance with an aspect of the present invention, a biodegradable panel includes a panel layer and a printed layer formed on the panel layer wherein the panel layer includes a PLA resin.

In accordance with another aspect of the present invention, a biodegradable panel includes a base layer, a panel layer formed on the base layer, and a printed layer formed on the panel layer wherein the panel layer includes a PLA resin.

In accordance with a further aspect of the present invention, a biodegradable panel includes a base layer, a panel layer formed on the base layer, a printed layer formed on the panel layer, and a transparent layer formed on the printed layer wherein at least one layer of the panel layer and the transparent layer includes a PLA resin.

Advantageous Effects

The biodegradable panels of the present invention use a PLA resin derived from vegetable resources as a substituted for conventional PVC. Therefore, the present invention can solve problems associated with the supply of raw materials arising from depletion of petroleum resources.

In addition, the biodegradable panels of the present invention emit less environmentally harmful substances such as $CO_2$ during production and are safely discarded.

Furthermore, the biodegradable panels of the present invention are applicable to a wide range of fields, including wall elements and interior decorative elements of buildings.

BEST MODE

Figure 1:
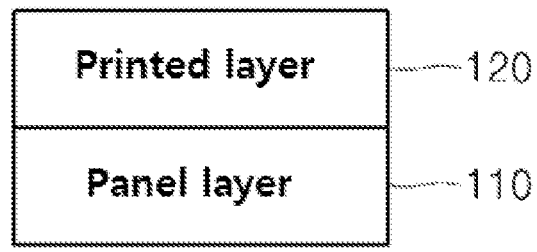
FIGS. 1 to 3 are cross-sectional views illustrating embodiments of biodegradable panels according to the present invention.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and a thorough understanding of the present invention by those skilled in the art. The scope of the present invention is defined only by the claims. Like components will be denoted by like reference numerals throughout the specification.

Hereinafter, biodegradable panels according to preferred embodiments of the present invention will be described in detail with reference to the accompanying drawings.

Figure 2:
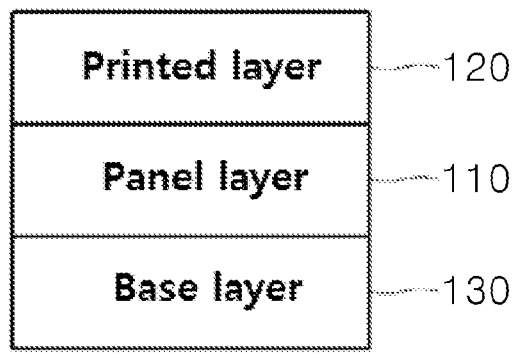
Figure 3:
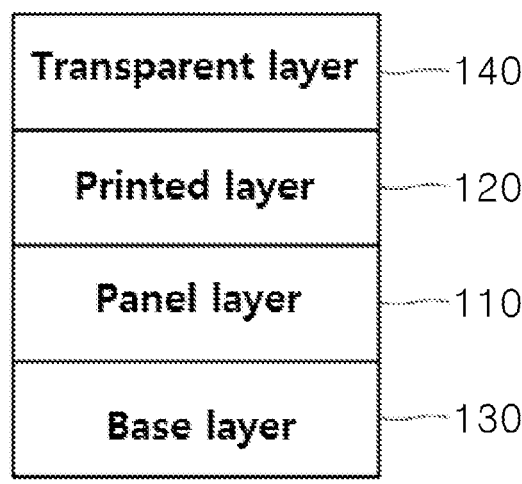

FIGS. 1 to 3 are cross-sectional views illustrating biodegradable panels according to embodiments of the present invention.

The biodegradable panel illustrated in FIG. 1 includes a panel layer 110 and a printed layer 120 formed in this order from the bottom. The panel layer 110 includes a PLA resin.

As illustrated in FIG. 2, the biodegradable panel may further include a base layer 130 formed under the panel layer 110. The panel layer 110 includes a PLA resin.

The biodegradable panel illustrated in FIG. 3 may further include a transparent layer 140 formed on the printed layer 120 of the biodegradable panel illustrated in FIG. 2. At least one layer of the panel layer 110 and the transparent layer 140 includes a PLA resin.

PLA resins are thermoplastic polyesters of lactide or lactic acid. For example, PLA resins may be produced by polymerization of lactic acid, which is obtained by fermentation of starch extracted from corn or potatoes. The use of PLA resins obtained from readily available renewable vegetable resources such as corn and potatoes can effectively solve problems arising from depletion of petroleum resources.

PLA resins are environmentally friendly materials that emit far fewer environmentally harmful substances such as $CO_2$ during use or when discarded than petroleum-based substances such as polyvinyl chloride (PVC), and are readily biodegradable once disposed of under natural environmental conditions.

PLA resins can be classified into crystalline PLA (c-PLA) resins and amorphous PLA (a-PLA) resins. Plasticizers may bleed toward the surface of sheets using crystalline PLA resins. In view of this phenomenon, it is preferred to use amorphous PLA resins. The use of amorphous PLA resins avoids the need to add compatibilizers, which are essential components in PVC production to prevent the occurrence of bleeding. Particularly, 100% amorphous PLA resins are most preferably used. If needed, combinations of crystalline PLA resins and amorphous PLA resins may be used.

The term "PLA resin' as used herein is intended to include a PLA resin in the form of a sol, a PLA resin blended with a bioresin, and a PLA resin blended with a synthetic resin.

First, a PLA resin in the form of a sol may be used in the biodegradable panel of the present invention. The PLA resin in the form of a sol may be produced by adding a PLA resin to a volatile solvent to prepare a PLA solution, adding a plasticizer to the PLA solution, and drying the mixture to remove the volatile solvent. Alternatively, the PLA resin in the form of a sol may be produced by adding a plasticizer to a PLA resin in a pellet or powder form.

A blended resin of a PLA resin and a bioresin may also be used in the biodegradable panel of the present invention. The bioresin type is not limited so long as it is biodegradable. Particularly, the bioresin is selected from cellulose, chitin, starch, polyhydroxyalkanoate (PHA), polyhydroxybutyrate valerate (PHBV), polyvinyl alcohol (PVA), polyglycolic acid (PGA), polybutylene succinate (PBS), poly(butylene adipate-co-butylene succinate) (PBSA), polybutylene adipate terephthalate (PBAT), polycaprolactone (PCL), poly(esteramide), poly(ester-urethane), and mixtures thereof. These bioresins are preferred in terms of compatibility with PLA resins and biodegradability.

Preferably, the blended resin includes 10 to 70 parts by weight of the bioresin, based on 100 parts by weight of the PLA resin. If the bioresin is present in an amount of less than 10 parts by weight, blending is likely to be ineffective. Meanwhile, the presence of the bioresin in an amount exceeding 70 parts by weight may cause problems in terms of compatibility with other additives.

The biodegradable panel of the present invention may also use a blended resin of a PLA resin and a synthetic resin. The synthetic resin is selected from polyvinyl chloride (PVC), polyethylene glycol (PEG), ethylene vinyl acetate (EVA), thermoplastic elastomers (TPEs), thermoplastic polyurethane (TPU), thermoplastic starch (TPS), epoxidized natural rubbers (ENRs), ionomers, styrene butadiene styrene (SBS), nitrile butadiene rubbers (NBRs), styrene ethylene butylene styrene (SEBS), acrylates, acrylonitrile butadiene styrene (ABS), polyolefin modified with compatibilizer, polyurethane (PU), polyamide, polyester, and mixtures thereof. These synthetic resins are preferred in terms of compatibility with PLA resins and biodegradability.

Preferably, the blended resin includes 10 to 70 parts by weight of the synthetic resin, based on 100 parts by weight of the PLA resin. The presence of the synthetic resin in an amount of less than 10 parts by weight results in ineffective blending. Meanwhile, the presence of the synthetic resin in an amount exceeding 70 parts by weight may cause problems in terms of compatibility with other additives and inhibits the objective of biodegradability.

A plasticizer and a processing aid may be added to the PLA resin constituting the panel of the present invention.

The plasticizer is particularly preferably a non-phthalate plasticizer. The non-phthalate plasticizer is environmentally friendly and softens the PLA resin to achieve enhanced thermoplasticity, which facilitates molding of the PLA resin at high temperature. Taking into consideration the physical properties of the corresponding layer, the non-phthalate plasticizer is preferably selected from citric acid, citrates, epoxidized vegetable oils, fatty acid esters, polyethylene glycol, polyethylene propylene glycol, and glycerol esters.

The non-phthalate plasticizer is included in the transparent layer 140 and is preferably used in an amount of 5 to 50 parts by weight, based on 100 parts by weight of the PLA resin.

If the content of the plasticizer in the corresponding layer is less than the lower limit defined above, the hardness of the PLA resin may increase, resulting in poor processability. Meanwhile, if the plasticizer content exceeds the upper limit defined above, compatibility with the other components may be poor, causing degradation of physical properties.

The processing aid serves to increase the melt strength of the PLA resin. Low melt strength or heat resistance inherent to the PLA resin is the reason why the addition of the processing aid is preferred.

The processing aid is preferably selected from acrylic copolymers, epoxy copolymers, urethane copolymers, and polyolefin copolymers. The processing aid compensates for the melt strength of the PLA resin to facilitate processing, for example, calendering of the PLA resin.

The processing aid is included in the transparent layer 140 and is preferably used in an amount of 0.1 to 20 parts by weight, based on 100 parts by weight of the PLA resin.

If the content of the processing aid in the corresponding layer is less than the lower limit defined above, sufficient improvements in the melting efficiency and melt strength of the PLA resin are not obtained. Meanwhile, if the content of the processing aid exceeds the upper limit defined above, a rise in production costs is inevitable and poor compatibility with other materials constituting the layers of the panel may be caused, leading to deterioration in overall physical properties of the layers.

A lubricant, an additive or a mixture thereof may be further added to the PLA resin constituting the biodegradable panel of the present invention.

The lubricant is added to prevent the PLA resin from adhering to a calender roll or a press during processing, for example, calendering of the PLA resin.

Examples of such lubricants include, but are not limited to, stearic acid, waxes, hydrocarbons, and silicone. Environmentally friendly higher fatty acids are particularly preferable in the present invention. As an example of the higher fatty acids, there may be mentioned stearic acid, which is a saturated higher fatty acid having 18 carbon atoms.

The lubricant may be included in the transparent layer 140 and is preferably used in an amount of 0.1 to 8 parts by weight, based on 100 parts by weight of the PLA resin.

If the lubricant content is less than 0.1 parts by weight, based on 100 parts by weight of the PLA resin, the lubricant does not exhibit any of the desired effects. Meanwhile, if the lubricant content exceeds 8 parts by weight, based on 100 parts by weight of the PLA resin, the impact resistance, heat resistance and gloss of the PLA resin may be degraded.

As the additive, there may be used, for example, a cross-linking agent, an anti-hydrolysis agent, or a reinforcing agent.

The cross-linking agent serves to increase the molecular weight of the PLA resin through chain extension, achieving improved physical properties such as high tensile strength and heat resistance.

Examples of such cross-linking agents include, but are not necessarily limited to, diisocyanates, epoxy group-containing copolymers, and hydroxycarboxylic acid compounds.

The cross-linking agent may be included in both of the panel layer 110 and the transparent layer 140. Preferably, the panel layer 110 and the transparent layer 140 use 0.1 to 5.0 parts by weight and 0.01 to 10 parts by weight of the cross-linking agent, respectively, based on 100 parts by weight of the PLA resin.

If the contents of the cross-linking agent are less than the lower limits defined above, the PLA layer may exhibit poor heat resistance. Meanwhile, if the contents of the cross-linking agent exceed the upper limits defined above, there may be an increased risk of low flexibility.

The anti-hydrolysis agent serves to prevent the mechanical properties, such as impact resistance, of the PLA resin from deterioration resulting from hydrolysis of the PLA resin.

The anti-hydrolysis agent may be one commonly used in the art, and examples thereof include, but are not limited to, carbodiimides and oxazolines.

The anti-hydrolysis agent may be included in the transparent layer 140 and is preferably used in an amount of 0.01 to 10 parts by weight, based on 100 parts by weight of the PLA resin.

If the content of the anti-hydrolysis agent is less than the lower limit defined above, the PLA resin may be hydrolyzed due to the presence of moisture during processing. Meanwhile, if the content of the anti-hydrolysis agent exceeds the upper limit defined above, molding processability of the PLA resin may deteriorate and the production cost of the panel may be considerably increased due to the high cost of the anti-hydrolysis agent.

The reinforcing agent may be included in the panel layer 110. There is no particular restriction on the kind of the reinforcing agent. Examples of preferred reinforcing agents include wood flour, paper, and fiber. These reinforcing agents may be used alone or as a mixture thereof.

The reinforcing agent is preferably used in an amount of 1.0 to 10.0 parts by weight, based on the total weight of the panel layer. The use of the reinforcing agent in an amount of less than the lower limit defined above may cause problems associated with the panel strength. Meanwhile, the use of the reinforcing agent in an amount exceeding the upper limit defined above may cause bending of the panel.

First, an explanation will be given concerning the panel layer 110, the printed layer 120, the base layer 130, and the transparent layer 140 illustrated in FIGS. 1 to 3.

The panel layer 110 is the most basic layer of the panel and supports the overlying printed layer 120.

The panel layer 110 acts as a base while imparting an aesthetic effect to the panel. The presence of a biodegradable PLA resin in the panel layer 110 ensures environmental friendliness of the panel layer.

As explained above, the panel layer 110 may employ a PLA resin, and a reinforcing agent, a plasticizer or a mixture thereof may be further added to the PLA resin. The composition of the components in the panel layer 110 is as described above.

The panel layer 110 may be formed by a process known in the art. Examples of suitable processes include, but are not limited to, injection molding and pressing.

The printed layer 120 formed on the panel layer 110 imparts various patterns and/or colors to the panel to further improve the aesthetics of the panel. There is no particular restriction on the method for the formation of the printed layer 120. For example, the printed layer 120 may be formed by any suitable printing technique known in the art, such as gravure printing, transfer printing, digital printing or rotary printing. A known photorealistic printing technique such as ink-jet printing may also be used to impart a more natural aesthetic effect.

In the biodegradable panel of the present invention, the base layer 130 may be further formed under the panel layer 110, as illustrated in FIG. 2. The base layer 130 may be formed using any suitable material known in the art. Non-limiting examples of materials for the base layer include vellum paper, a non-woven fabric, and a cotton fabric.

The vellum paper is composed of pulp, and the non-woven fabric is composed of a combination of pulp and polyester.

The basis weight of the vellum paper, the non-woven fabric or the cotton fabric constituting the base layer is preferably from 80 to 200 $g/m^2$. If the base layer has a basis weight of less than 80 $g/m^2$, the panel may be damaged, for example, tearing may occur during construction or in use. Meanwhile, if the base layer has a basis weight exceeding 200 $g/m^2$, the base layer becomes excessively heavy and is apt to crack and curl, making it difficult to construct the panel. In the biodegradable panel of the present invention, the transparent layer 140 may be further formed on the printed layer 120, as illustrated in FIG. 3.

The transparent layer 140 formed on the printed layer 120 serves to improve the durability of the panel while protecting the pattern formed on the upper side of the printed layer 130.

As described above, the transparent layer 130 may use a PLA resin containing a plasticizer and a processing aid. A plasticizer, an anti-hydrolysis agent or a mixture thereof may be further added to the PLA resin. The composition of the components has been described above.

Production of Inventive Panels and Comparative Panel

In the following examples and comparative example, panels according to preferred embodiments of the present invention and a comparative panel were produced. However, these examples are provided for illustrative purposes only and are not be construed as in any way limiting the invention.

Embodiments that are not described herein will be readily recognized and appreciated by those skilled in the art, and thus explanation thereof is omitted.

EXAMPLES

Production Methods of Constituent Layers

1. Base Layer

A base layer was formed using a non-woven fabric composed of 70% pulp and 30% polyester.

2. Formation of Panel Layer 100 parts by weight of a PLA resin, 10 parts by weight of wood flour, and 5 parts by weight of a cross-linking agent were mixed. A panel layer was formed using the mixture by a known injection molding process.

3. Formation of Printed Layer

A water-based ink pigment and an oil-based ink pigment were mixed depending on the number of printing colors. The pigment mixture was transfer printed on the resin layer to form a pattern.

4. Formation of Transparent Layer 100 parts by weight of a PLA resin, 50 parts by weight of critic acid, 10 parts by weight of an acrylic copolymer, 8 parts by weight of stearic acid, and 5 parts by weight of a cross-linking agent were mixed to prepare a paste. The paste was coated on the printed layer.

Examples 1-5

In accordance with the layer structures shown in Table 1, the constituent layers selected from the base layer, the panel layer, the printed layer, and the transparent layer were sequentially laminated to produce biodegradable panels of Examples 1-5.

Particularly, a blend of the PLA resin and a bioresin, and a blend of the PLA resin and a synthetic resin were used in the panel layers of the biodegradable panels of Examples 2 and 3, respectively, and the compositions thereof are shown in Table 1.

TABLE 1

|  | Base layer | Panel layer | Printed layer | Transparent layer |
|---|---|---|---|---|
| Example 1 |  | ○ | ○ |  |
| Example 2 |  | ○ PLA 100 parts by weight PBS 30 parts by weight | ○ |  |
| Example 3 |  | ○ PLA 100 parts by weight PVC 30 parts by weight | ○ |  |
| Example 4 | ○ | ○ | ○ |  |
| Example 5 | ○ | ○ | ○ | ○ |

Comparative Example

A base layer was formed using a base paper composed of 100% pulp. A paste including a PVC resin was coated on the base layer, and dried to produce a commercially available PVC silk panel.

Evaluations

The panels of Examples 1-5 and Comparative Example were evaluated with regard to the parameters shown in Table 2, and the results were compared.

TABLE 2

|  | Curling property | Moisture vapor permeability | Light fastness | TVOCs |
|---|---|---|---|---|
| Example 1 | ○ | ○ | ○ | ○ |
| Example 2 | ○ | ○ | Δ | ○ |
| Example 3 | ○ | Δ | ○ | ○ |
| Example 4 | ○ | ○ | ○ | ○ |
| Example 5 | ○ | ○ | ○ | ○ |
| Comparative Example | ○ | ○ | ○ | Δ |

Curling property refers to the degree of curling of the specimen after dipping in a water bath and standing in an oven at 80° C. Curling property was evaluated to be "good (○)" when the degree of curling was less than ±0.35 mm, and "poor (x)" when it was not less than ±0.35 mm.

Moisture vapor permeability was defined as the mass of water vapor passing through the product. Moisture vapor permeability was evaluated to be "good (○)" when the mass of passing water vapor was not less than 175 g/m$^2$·24 hr, and "poor (x)" when it was less than 175 g/m$^2$·24 hr.

Light fastness was graded based on the criteria specified in KS M 7305. Light fastness was evaluated to be "good (○)" when the grade was not less than 4 and "poor (x)" when it was less than 4.

Environmental friendliness refers to the emission levels of total volatile organic compounds (TVOCs) and formaldehyde (HCHO). Environmental friendliness was evaluated to be "good (○)" when the TVOC and HCHO emission levels were less than 0.1 mg/m$^2$·h and less than 0.015 mg/m$^2$·h, respectively, "fair (Δ)" when the TVOC emission level was 0.09-0.12 mg/m$^2$·h or the HCHO emission level was 0.013-0.017 mg/m$^2$·h, and poor (x) when the TVOC and HCHO emission levels were not less than 0.1 mg/m$^2$·h and not less than 0.015 mg/m$^2$·h, respectively.

As can be seen from the results of evaluations, the dimensional stability, moisture vapor permeability, and light fastness of the inventive biodegradable panels were sufficient to replace the PVC panel. The inventive biodegradable panels emitted smaller amounts of TVOCs than the PVC panel, demonstrating superior environmental friendliness thereof.

Although the present invention has been described with reference to some embodiments and the accompanying drawings, it will be understood by those skilled in the art that these embodiments are provided for illustrative purposes only, and various modifications, changes, alterations and equivalent embodiments can be made without departing from the scope of the present invention. Therefore, the scope and sprit of the present invention should be defined only by the accompanying claims and equivalents thereof.

The invention claimed is:

1. A biodegradable panel, comprising:
   a panel layer; and
   a printed layer disposed on the panel layer,
   wherein the panel layer comprises a polylactic acid (PLA) resin
   a plasticizer; and
   a cross-linking agent, wherein the polylactic acid (PLA) resin is only an amorphous polylactic acid (a-PLA) and,
   wherein the panel layer comprises 0.1 to 5.0 parts by weight of the cross-linking agent based on 100 parts by weight of the PLA resin.

2. The biodegradable panel according to claim 1, wherein the panel layer comprises a blended resin of the PLA resin and a bioresin.

3. The biodegradable panel according to claim 1, wherein the panel layer comprises a blended resin of the PLA resin and a synthetic resin.

4. The biodegradable panel according to claim 1, wherein the panel layer further comprises a reinforcing agent.

5. The biodegradable panel according to claim 2, wherein the blended resin comprises 10 to 70 parts by weight of the bioresin, based on 100 parts by weight of the PLA resin.

6. The biodegradable panel according to claim 3, wherein the blended resin comprises 10 to 70 parts by weight of the synthetic resin, based on 100 parts by weight of the PLA resin.

7. A biodegradable panel, comprising:
   a base layer;
   a panel layer disposed on the base layer;
   a printed layer disposed on the panel layer; and
   a transparent layer disposed on the printed layer,
   wherein each of the panel layer and the transparent layer comprises a polylactic acid (PLA) resin and a cross-linking agent,
   wherein the panel layer comprises 0.1 to 5.0 parts by weight of the cross-linking agent based on 100 parts by weight of the PLA resin, and
   wherein the transparent layer comprises 0.01 to 10 parts by weight of the cross-linking agent based on 100 parts by weight of the PLA resin.

8. The biodegradable panel according to claim 7, wherein each of the panel layer and the transparent layer comprises a blended resin of the PLA resin and a bioresin.

9. The biodegradable panel according to claim 7, wherein each of the panel layer and the transparent layer comprises a blended resin of the PLA resin and a synthetic resin.

10. The biodegradable panel according to claim 7, wherein the panel layer further comprises a reinforcing agent.

11. The biodegradable panel according to claim 7, wherein the transparent layer further comprises a plasticizer, a processing aid, or a mixture thereof.

12. The biodegradable panel according to claim 7, wherein the transparent layer further comprises a lubricant, an anti-hydrolysis agent, or a mixture thereof.

13. The biodegradable panel according to claim 8, wherein the blended resin comprises 10 to 70 parts by weight of the bioresin, based on 100 parts by weight of the PLA resin.

14. The biodegradable panel according to claim 8, wherein the blended resin comprises 10 to 70 parts by weight of the synthetic resin, based on 100 parts by weight of the PLA resin.

* * * * *